Patented July 26, 1932

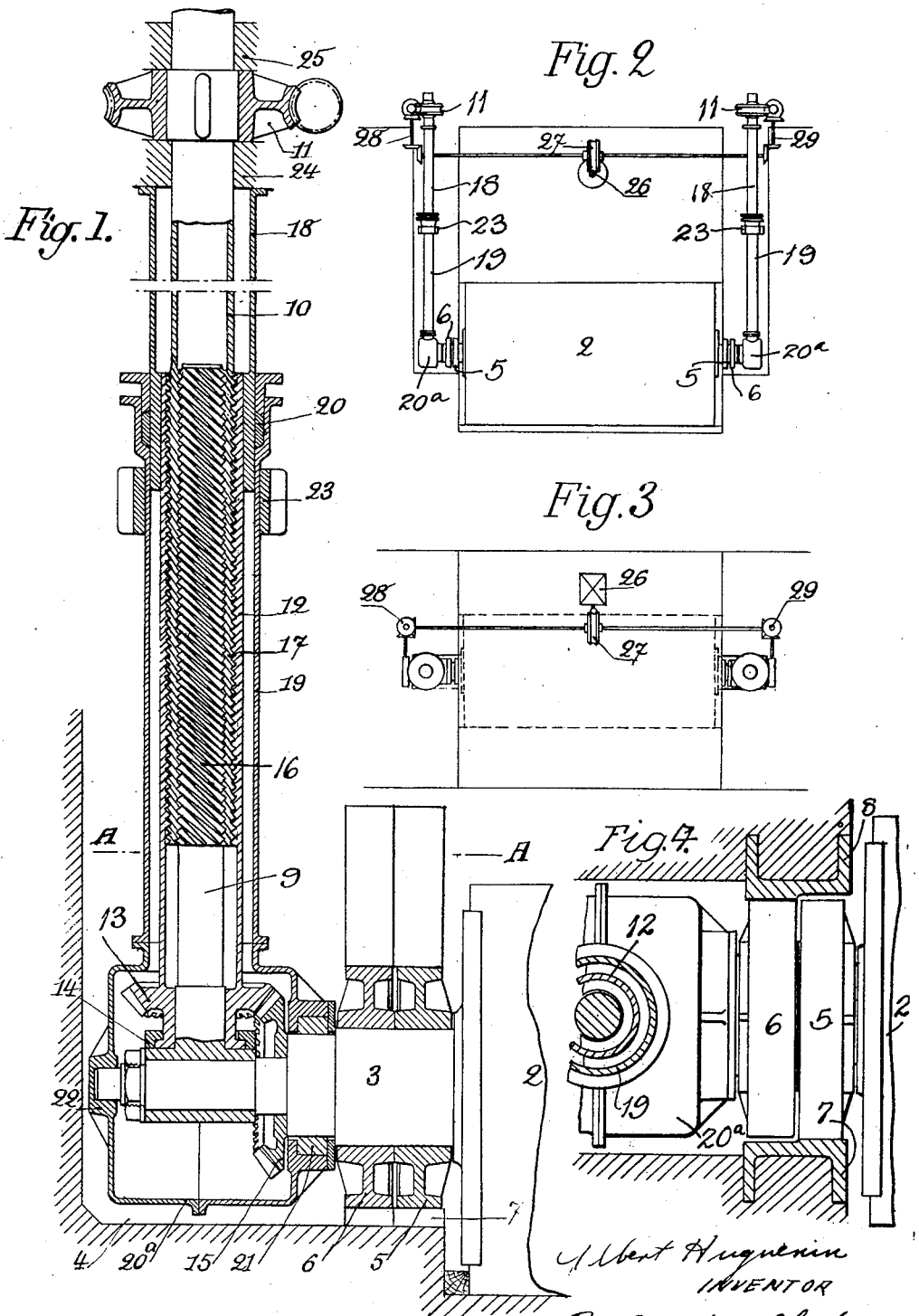

1,868,575

UNITED STATES PATENT OFFICE

ALBERT HUGUENIN, OF PARIS, FRANCE

CLOSING DEVICE FOR LARGE OPENINGS WHICH ARE ESSENTIALLY HORIZONTAL AND ARE MADE WATER TIGHT IN ALL PARTS

Application filed July 10, 1928, Serial No. 291,667, and in France July 23, 1927.

Known devices are employed for the closing of large openings, in which the use of a rack and its operation under water in cooperation with a pinion mounted on the closing device, will offer practical disadvantages of a very serious nature.

The said invention relates to a device for the simultaneous control of the two movements of the gate, while at the same time the entire mechanism is placed out of contact with the water.

The appended drawing shows by way of example a constructional form of the said apparatus.

Fig. 1 is a partial view of the movement in elevation.

Figs. 2 and 3 are respectively an elevational view and a general plan view.

Fig. 4 is a horizontal section made according to line A—A of Fig. 1.

As shown in Fig. 1, 2 is the main body of the gate and 3 its shaft which extends beyond the lateral face of the opening in a recess 4, formed in the side walls which serve as lateral partitions for the circulation openings.

The said shaft carries two rollers 5—6 coacting with the respective roller races 7—8 mounted in the side wall on either side of the recess 4 along the whole height of the vertical movement of the gate 2. As the pressure on the closing element may work either one side or the other and is changing during both the upwards and the downwards motion, it is necessary that for the correct transmission of the said water pressure on the closing element for each direction and for both the possible motions, upwards and downwards, there is a special roller transmitting the water pressure on the respective roller race. Thus each end of the closing element bears on its shaft 3, two rollers 5—6 rolling respectively on the races 7—8.

A screwthreaded rod 9, which holds the tenon 3 near its end, is screwed into a hollow shaft 10 whose lower part is threaded, and the rotation of said shaft by the worm gearing 11 causes the gate 2 to rise and descend.

To effect at the same time a very slow rotation of the gate 2 (about 230°), the hollow shaft 10 is screwed into the hollow shaft 12 which ends in a bevel gear 13 at its lower part and is held fast in the axial direction by the device 14 at the lower end of the lifting rod. The pinion 13 acts upon a bevel gear wheel 15 mounted on the shaft 3 and which is thus connected with the gate 2. In order to effect a slow rotation of the gate 2 during its upward movement, the screw thread of the rod shown at 17 is somewhat different from the thread 16 on the rod 9, and since the hollow shaft 12 is connected with the rod 9 as concerns the axial motion, this causes a slow rotation during the rise or descent of the hollow shaft 12 relatively to the rod 9 and hence a slow rotation of the gate 2 in the proper direction for the rise and descent of the gate.

The control of these two movements by means of a set of worm gearing 11 which is irreversible will assure for each possible position of the gate 2 during its course, both upwardly and downwardly, a complete stability, whatever may be the external forces to which it is subjected.

It will be an easy matter to enclose the whole of the said mechanism in a watertight casing by means of a fixed sheath 19 with slidable stuffing box 20 on a sheath 18 fixed to a stationary part 24 of the control mechanism; the sheath 19 surrounds at its lower part 20a, the whole of the mechanism around the shaft 3, and the water is shut off by the stuffing box 21 which is properly constructed in such a manner as to require only an initial adjustment.

In order to readily support the weight of the sheath 19, this latter is mounted at the end of the shaft 3 by means of a bearing 22, and the said sheath is also guided in a fixed sleeve 23 which may be placed near the gearing, between the hollow shaft 10 and the solid shaft 9.

The fixed bearings 24—25 complete, in principle, the arrangement of the hollow shaft 10 together with its worm gearing 11 which constitutes the sole controlling element of the entire mechanism.

In this manner, the whole of the controlling mechanism is entirely protected from the action of the water, whereby the duration of the said apparatus is assured.

As shown in Figs. 2 and 3, it is practicable to actuate the two controls of the aforesaid mechanism situated at each end of the gate 2 by a single motor 26 which drives—by worm gearing 27 and bevel gearing 28 and 29—the two main controls on either side of the gate.

The entire construction is thus of a most substantial nature and can thus be subjected to severe stresses in the most unfavorable conditions.

The principal object of the said invention is to provide for the simultaneous rise and rotation of the gate by a single external control, acting at one or both ends of the gate, and their common drive is given solely by way of example and may obviously be effected by other suitable means.

I claim:

In a device for closing large openings which are essentially horizontal and are made water-tight in all parts, the combination of a closing element adapted to rotate and to be displaced in a direction perpendicular to its axis of rotation, a hollow rotating shaft, held stationary in the direction of its axis and having two threads of different pitches on its inner and outer surfaces, a nonrotatable rod having a thread in engagement with the inner thread of the said hollow shaft, this rod being connected to the said closing element for moving it in a direction perpendicular to the axis of rotation of the latter, and a second hollow rotating shaft having a thread in engagement with the outer thread of the first hollow shaft, this second hollow shaft being connected, on the one hand, to the said rod for integrally following the axial displacements of this rod, and, on the other hand, to the said closing element for transmitting its movement of rotation to the latter.

In testimony whereof I have hereunto affixed my signature.

ALBERT HUGUENIN.